United States Patent
Maloney et al.

(10) Patent No.: US 11,879,053 B2
(45) Date of Patent: Jan. 23, 2024

(54) HEAT SINK COMPOSITION FOR ELECTRICALLY RESISTIVE AND THERMALLY CONDUCTIVE CIRCUIT BREAKER AND LOAD CENTER AND METHOD OF PREPARATION THEREFOR

(71) Applicant: EATON INTELLIGENT POWER LIMITED, Dublin (IE)

(72) Inventors: James Gerard Maloney, Industry, PA (US); Edward Ethber Lias, Aliquippa, PA (US); Jeffrey Scott Gibson, Hookstown, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 25 days.

(21) Appl. No.: 17/672,143

(22) Filed: Feb. 15, 2022

(65) Prior Publication Data
US 2022/0169831 A1    Jun. 2, 2022

Related U.S. Application Data

(63) Continuation of application No. 14/012,398, filed on Aug. 28, 2013, now Pat. No. 11,286,372.

(51) Int. Cl.
*C08K 7/02*    (2006.01)
*H01H 9/02*    (2006.01)
(Continued)

(52) U.S. Cl.
CPC .............. *C08K 7/02* (2013.01); *B29C 45/46* (2013.01); *H01H 9/02* (2013.01); *H01H 9/52* (2013.01);
(Continued)

(58) Field of Classification Search
CPC . C08K 7/02; B29C 45/46; H01H 9/02; H01H 9/52; H01H 2300/36; B29K 2101/00; B29K 2505/00
(Continued)

(56) References Cited

U.S. PATENT DOCUMENTS

2011/0040007 A1*    2/2011   Chandrasekhar ........ H01B 1/22
524/404

FOREIGN PATENT DOCUMENTS

JP        2010258112 A    * 11/2010

OTHER PUBLICATIONS

Machine translation of JP-2010258112-A (Year: 2010).*

* cited by examiner

*Primary Examiner* — Vincent Tatesure
(74) *Attorney, Agent, or Firm* — Eckert Seamans Cherin & Mellott, LLC

(57) ABSTRACT

The disclosed concept relates to compositions and methods for the manufacture of electrically resistive, thermally conductive electrical switching apparatus. The composition includes a polymer component and a nanofiber component. The thermal conductivity of the nanofiber component is higher than the thermal conductivity of the polymer component such that the electrical switching apparatus which includes the composition of the disclosed concept has improved heat dissipation as compared to an electrical switching apparatus constructed of the polymer component in the absence of the nanofiber component. Further, the disclosed concept relates to methods of lowering the internal temperature of an electrically resistive, thermally conductive electrical switching apparatus by forming the internals of the apparatus, e.g., circuit breakers, and/or the enclosure from the composition of the disclosed concept.

6 Claims, 3 Drawing Sheets

(51) Int. Cl.
   *H01H 9/52* (2006.01)
   *B29C 45/46* (2006.01)
   *B29K 101/00* (2006.01)
   *B29K 505/00* (2006.01)

(52) U.S. Cl.
   CPC ...... *B29K 2101/00* (2013.01); *B29K 2505/00* (2013.01); *H01H 2300/036* (2013.01)

(58) Field of Classification Search
   USPC .............................................. 442/59; 252/74
   See application file for complete search history.

HEAT SINK COMPOSITION FOR ELECTRICALLY RESISTIVE AND THERMALLY CONDUCTIVE CIRCUIT BREAKER AND LOAD CENTER AND METHOD OF PREPARATION THEREFOR

CROSS-REFERENCE TO RELATED APPLICATION

This application is a continuation of, and claims priority to, U.S. patent application Ser. No. 14/012,398, filed Aug. 28, 2013, entitled "HEAT SINK COMPOSITION FOR ELECTRICALLY RESISTIVE AND THERMALLY CONDUCTIVE CIRCUIT BREAKER AND LOAD CENTER AND METHOD OF PREPARATION THEREFOR", the contents of which are incorporated herein by reference.

BACKGROUND

Field

The disclosed concept pertains generally to electrical switching apparatus and, more particularly, to circuit interrupters, such as circuit breakers and load panels or centers. The disclosed concept further pertains to compositions for manufacturing electrical switching apparatus and related enclosures, and methods for preparing the compositions.

Background Information

Electrical switching apparatus include, for example, circuit switching devices and circuit interrupters, such as circuit breakers, contactors, motor starters, motor controllers and other load centers. These apparatus are generally well known in the art. For example, circuit breakers are known to include at least one pair of separable contacts which are operated to protect electrical circuitry from damage due to an overcurrent condition, such as an overload condition or a relatively high level short circuit or fault condition. Electrical switching apparatus generally include a housing to provide an enclosure for the electronics contained therein, e.g., separable contacts, operating mechanism and trip mechanism, as well as to provide strength and temperature insulation. The material of construction for the housing can be selected from a variety of known materials which may be molded in various geometries, such as but not limited to liquid crystal polymer thermoplastic. In some instances, the housing can be formed by a process known as insert molding which is an injection molding process whereby resin is introduced, e.g., injected, into a cavity or mold and then allowed to set or cure. The result is a single molded plastic piece, e.g., housing.

Typically, the molded plastic used in an electrical switching apparatus, e.g., circuit breaker or load center is electrically resistive, i.e., electrical current cannot pass therethrough, such as to provide a barrier to shield and protect personnel located outside of the apparatus from contact with electrically conductive parts, and the potential for electrocution.

Also known in the art are various techniques for producing composite fibers in nanoscale dimensions, such as electrospinning and ForceSpinning™ technology. A typical electrospinning process is illustrated in FIG. 1. As shown in FIG. 1, the electrospinning apparatus includes a syringe 1 containing a polymer molten mass 2 or a solution. A spinning capillary 3 is located at the tip of the syringe 1, which is coupled with a pole of the voltage-generating arrangement 6 (current supply). By means of an injection pump 9, the polymer molten mass 2 is transported out of the syringe 1 towards the spinning capillary 3, where drops are formed at the tip. The surface tension of the drop of the polymer molten mass 2 or solution coming out of the spinning capillary 3 is overcome by means of an electric field between the spinning capillary 3 and a counter electrode 5. Then, the drop coming out of the spinning capillary 3 deforms and when it reaches a critical electric potential it is drawn to yield a fine filament, the so-called jet. This electrically-charged jet, continuously extracting new polymer molten mass 2 or solution from the spinning capillary 3 is then accelerated in the electric field towards the counter electrode 5. The jet solidifies during its flight towards the counter electrode 5 by means of the evaporation of the solvent or by means of cooling, such that in a short period of time continuous nanofibers 7 are generated, linked with one another, with typical diameters of a few nanometers to several micrometers. These nanofibers 7 are deposited on the template 4 associated with the counter electrode 5 in the form of a web or nonwoven mat. The conductive template 4 serves as a collector and is grounded together with the counter electrode 5. The polymer nanofibers 7 are spun directly on the conductive template 4.

A typical ForceSpinning™ apparatus (which is commercially available from FibeRio® Technology Corporation) is illustrated in FIG. 2. As shown in FIG. 2, the ForceSpinning™ apparatus includes a spinneret 20 having a reservoir 22 containing a liquid state material 24. During operation, the spinneret 20 is rotated centrifugally on an axis 25 at high revolutions per minute creating hydrostatic and centrifugal forces. As the spinneret 20 rotates, the hydrostatic and centrifugal forces push the liquid state material 24 to an outer wall 26 having an orifice 27 located therein. FIG. 2 shows one orifice 27; however, it is contemplated that a plurality of orifices may be formed in the outer wall 26. The liquid state material 24 enters the one or more orifices 27 and is released therefrom. The centrifugal and hydrostatic forces combine to initiate a jet of the liquid state material 24 that impinges against a fiber collector 28 to produce nanofibers 29. In FIG. 2, the fiber collector 28 is positioned to surround only a portion of the spinneret 20; however, it is contemplated that the fiber collector 28 may be positioned to surround up to the entire circumference of the spinneret 20.

The electrostatic force used to create nanofibers in an electrospinning apparatus is replaced by centrifugal forces in the ForceSpinning™ apparatus. The liquid state material can include solutions or molten materials, such as polymer melt. Examples of suitable materials include thermoplastic, thermoset resins and ram extruded polymers, such as polytetrafluoroethylene (PTFE). In addition to nanofibers, the apparatus can also produce fibers in the micron or submicron range. In the ForceSpinning™ technology, conductivity and/or electro-static charge are not relevant parameters for the selection of materials to create the fibers and thus, the spectrum of materials to be spun may be broader as compared with electrospinning, e.g., materials with low dielectric constants can be spun into nanofibers without the additional of salt or solvent. The controlled variables for the ForceSpinning™ apparatus are rotational speed of the spinneret, design of the collection system and, and shape and size of the orifices.

It is also known in the art to produce injection molded parts by injecting a polymer material into a mold. In a typical injection molding manufacturing process, heated molten plastic is forced into a mold cavity under pressure. Injection molding consists of a die containing a mold cavity which is formed to the shape of the desired finished component and is in direct fluid communication with a source of molten material, e.g., typically resin but can also include metal. The molten material is forced into the mold cavity and allowed to cool and set. As a result, the molten material conforms to the shape of the cavity. The cooled component is then removed from the mold cavity. This process then can be repeated to produce additional components.

In general, a mold cavity is a negative part being produced. That is, when the cavity is filled with plastic, it is cooled and the plastic becomes solid material resulting in a completed positive component.

Injection pressures can vary and can be in a range from 5,000 to 20,000 psi. Due to the high pressures involved, molds may need to be clamped shut during injection and cooling using clamping forces measured in tons.

Conventional injection molding techniques are capable of producing a large number of components with high levels of precision and consistency. For example, holding tolerances of less than 0.001 inch (0.0025 mm) can be relatively easily accomplished with the appropriate combination of material, component design and mold design. It has been demonstrated that even narrower (i.e., tighter) tolerances can be achieved with additional effort.

Conventional processes for the manufacture of electrical switching apparatus, e.g., circuit breakers, and enclosures typically utilize molding materials that are thermal insulators. In general, thermal insulators provide for low or minimum thermal conduction and heat dissipation. Thus, the circuit breakers and enclosures manufactured from thermal insulators electrically and thermally insulate the electronics contained therein from the current carrying operating mechanism. As a result, the terminals or other critical locations of the circuit breakers and enclosures may have elevated temperatures. It is known in the art to measure and record these temperatures (in the terminals or other critical locations) to assure safe operation and limited degradation or failure.

Accordingly, there is room for improvement in identifying materials for construction of molded electrical switching apparatus. It is desired to provide molding compositions which are electrically resistive and more thermally conductive for use in manufacturing electrical switching apparatus and enclosures, and ultimately to allow these apparatus to dissipate heat thereby reducing the amount of heat transferred and decreasing the temperature of the terminals or other critical locations.

Further, there is room for improvement in producing injection molded parts and, in particular, functionalizing the molded part in order to impart selected properties thereto.

SUMMARY

These needs and others are met by embodiments of the disclosed concept.

In accordance with one aspect of the disclosed concept, there is provided a composition for the manufacture of an electrically resistive and thermally conductive electrical switching apparatus. The composition includes a first component including polymer and a second component including nanofibers. The thermal conductivity of the second component is higher than the thermal conductivity of the first component such that the electrical switching apparatus including the composition has improved heat dissipation as compared to an electrical switching apparatus constructed of the first component in the absence of the second component.

The second component includes fiber material selected from polymer, polymer-containing material, metal, metal-containing material, inorganic material, and mixtures thereof, and filler. The filler can have higher thermal conductivity than the thermal conductivity of each of the fiber material and the first component.

In certain embodiments, the first and second components can be combined to form a mixture. The mixture can be subjected to an injection molding process to form a molded object which forms at least a portion of the electrical switching apparatus.

In certain other embodiments, the first component can be subjected to an injection molding process to form a molded object which forms at least a portion of the electrical switching apparatus and the second component can be deposited on at least a portion of an outer surface of the molded object. The second component can be in the form of a mat. The mat can be porous and furthermore, the molded object having the second component deposited on the outer surface can be transparent.

In accordance with another aspect of the disclosed concept, there is provided a method of preparing a molded component for manufacturing an electrically resistive and thermally conductive electrical switching apparatus. The method includes obtaining a first component comprising polymer and obtaining a second component. The second component includes fiber material selected from polymer, polymer-containing material, metal, metal-containing material, inorganic material, and mixtures thereof; and filler. The thermal conductivity of the second component is higher than thermal conductivity of the first component such that the electrical switching apparatus comprising the molded component has improved heat dissipation as compared to an electrical switching apparatus comprising the first component in absence of the second component. The method further includes combining the first component and the second component in an injection molding process to form a molded component, wherein the molded component at least partially forms the electrical switching apparatus.

The second component can include a layer of nanofibers at least partially deposited on a carrier substrate.

In certain embodiments, the combining of the first and second components can include at least partially depositing the second component on an inner surface of the mold, introducing the first component into the mold, allowing the first component to set, transferring at least partially the second component from the inner surface of the mold to an outer surface of the molded component and extracting the molded component from the mold. In these embodiments, the second component can include nanofibers deposited on a carrier film. Alternatively, the second component can include nanofibers deposited directly on the inner surface of the mold in the absence of a carrier film.

In accordance with yet another aspect of the disclosed concept there is provided a method of lowering the internal temperature of an electrically resistive and thermally conductive electrical switching apparatus. The method includes preparing a material of construction of the electrical switching apparatus by combining a first component including polymer and a second component including nanofibers to form a mixture. The thermal conductivity of the second component is higher than the thermal conductivity of the first component such that the electrical switching apparatus including the mixture has improved heat dissipation as compared to an electrical switching apparatus constructed of the first component in the absence of the second component. The mixture is poured into a mold and allowed to set. The set mixture is then extracted from the mold to form a molded part which is used to form at least a portion of the electrical switching apparatus.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
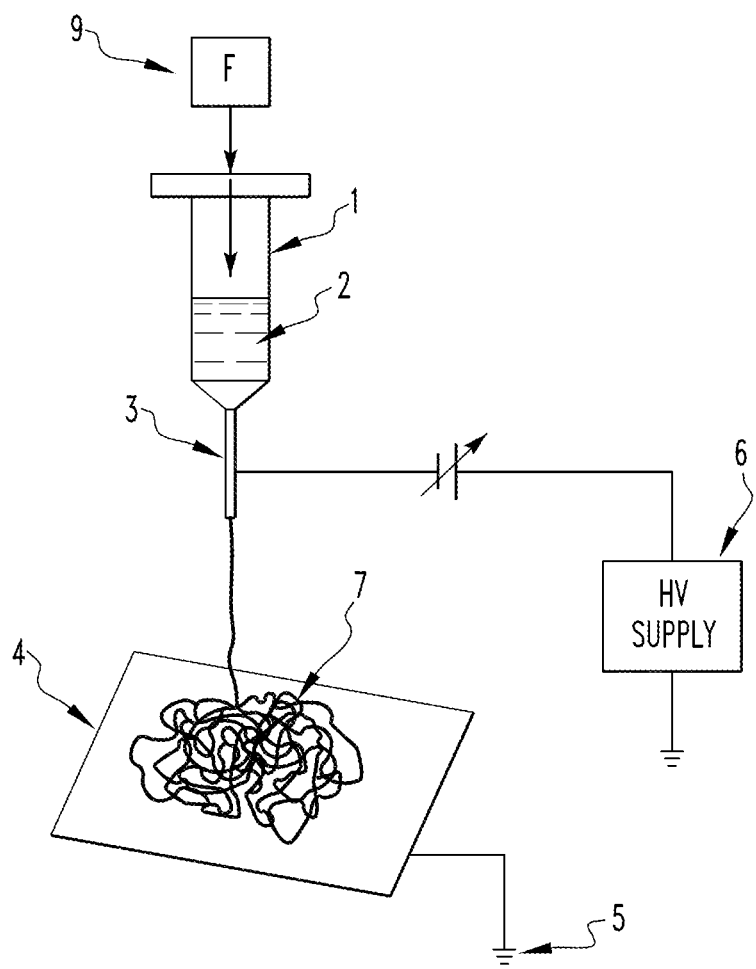
FIG. 1 is schematic of a conventional electrospinning apparatus, in accordance with the prior art.
Figure 2:
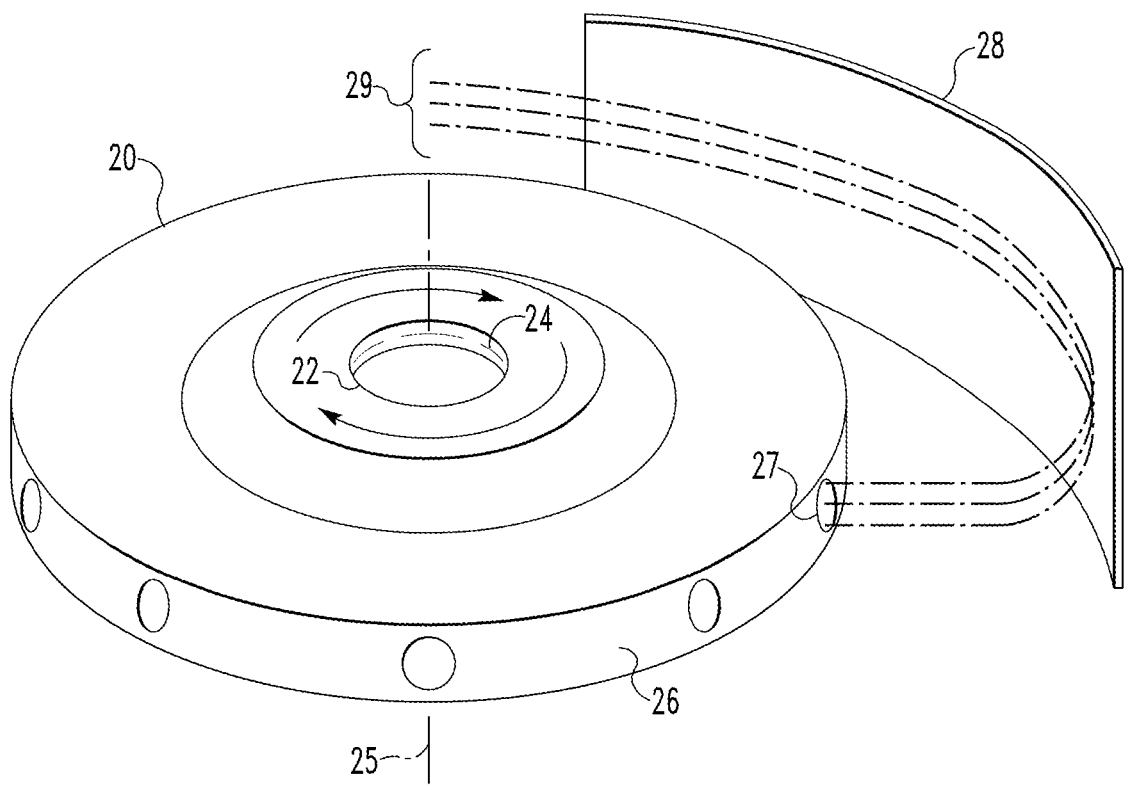
FIG. 2 is a schematic of a typical ForceSpinning™ apparatus, in accordance with the prior art.

As employed herein, the term "load center" shall mean a load panel, a panelboard, a circuit breaker panel, or any suitable enclosure enclosing or housing a plurality of circuit breakers for a plurality of branch or other load circuits. Further, as employed herein, the term "electrical switching apparatus" shall encompass related enclosures or housings.

As employed herein, the statement that two or more parts are "connected" together shall mean that the parts are joined together either directly or joined through one or more intermediate parts. Further, as employed herein, the statement that two or more parts are "attached" shall mean that the parts are joined together directly.

The disclosed concept is described in association with electrical switching apparatus, such as circuit breakers and load centers, and related enclosures, although it will become apparent that it could also be applied to other types of electrical switching apparatus (e.g., without limitation, other circuit switching devices and other circuit interrupters such as contactors, motor starters, motor controllers and other load controllers).

In certain embodiments, the disclosed concept includes an electrically resistive, heat sink compositions for making at least a portion of electrically resistive, thermally conductive electrical switching apparatus, such as circuit breakers and enclosures. It is known in the art to construct electrical switching apparatus from electrically resistive materials. Further, it is known in the art to construct electrical switching apparatus from thermal insulating materials, such as polymer, including but not limited to liquid crystal polymer. Polymers are not highly thermally conductive materials and therefore, are not very effective to dissipate heat. As a result, the conventional electrical switching apparatus, such as circuit breakers and enclosures that are formed from polymer, retain heat and therefore, result in an elevated temperature. Current operating practices can include measuring and recording temperatures in an area surrounding circuit breakers or nearby to monitor and control temperature increases.

There are various materials that are known to be suitable thermal conductors. However, these known materials typically are also electrically conductive. Due to critical safety considerations, a material for use in manufacturing electrical switching apparatus must exhibit electrical insulating properties. Thus, a suitable material of construction for electrical switching apparatus cannot merely exhibit thermal conductivity properties in the absence of electrical resistive properties. A desirable material for use in manufacturing electrical switching apparatus shall demonstrate electrical resistive properties in conjunction with thermal conductivity properties. An advantage of the disclosed concept is that a molded composition can be formed to manufacture electrical switching apparatus that exhibit both electrical resistive and thermal conductivity properties, such that the apparatus is capable of dissipating heat (without becoming an electrical conductor).

In the disclosed concept, electrically resistive, thermally conductive electrical switching apparatus are manufactured from a composition containing a first component including polymer and a second component including nanofibers. The nanofibers exhibit a higher thermal conductivity than the polymer component and therefore, the presence of the nanofiber component in the composition is effective to increase the thermal conductivity of an electrical switching apparatus formed from the composition. Thus, for example, in circuit breakers formed from the composition of the disclosed concept, the presence of the nanofiber component is effective to increase the dissipation of heat by the circuit breaker and thereby reduce the amount of heat transferred from the circuit breaker to the terminals or other locations (where temperature increases typically need to be monitored and controlled).

In certain embodiments, the composition of the disclosed concept can be utilized to form a back pan of an enclosure to increase the thermal conductivity of this area, decrease the internal temperature of the enclosure, and dissipate heat to a load center. The load center is typically constructed of metal, such as steel, and therefore, even though the temperature of the load center may increase (e.g., it may feel warm to the touch) as the result of heat transferred from the enclosure, the metal construction of the load center will provide for heat dissipation.

The nanofibers of the composition are prepared using fiber material and filler. The fiber material includes polymer, polymer-containing material, metal, metal-containing material, inorganic material, such as ceramic, and mixtures thereof. Suitable fillers for use can be selected from a wide variety of known materials. In general, different fillers can exhibit different properties and can impart these different properties to the polymer component and the composition, and ultimately an electrical switching apparatus which is at least partially constructed of the composition. Specific filler is selected based on its material properties functionality and therefore, the property or functionality that is desired for the resulting composition or molded part, e.g., electrical switching apparatus. For example, a thermally conductive filler is used to prepare nanofibers which are combined with a polymer component to impart thermal conductivity to the polymer component (which is not highly thermal conductive) and ultimately to the resulting electrical switching apparatus constructed therefrom. The filler (and the resulting nanofiber component) exhibits higher thermal conductivity than the polymer component, such that the thermal conductivity of the composition of the disclosed concept is higher than the thermal conductivity of the polymer component.

The nanofiber component can be prepared utilizing various conventional techniques known in the art including, but not limited to, electrospinning and ForceSpinning. Electrospinning techniques can be conducted at ambient temperature and pressure conditions. ForceSpinning is typically conducted at elevated temperature conditions, e.g., the melt temperature of the fiber material used to form the nanofibers.

The polymer component includes polymer and/or polymer-containing material, e.g., matrix, and can be selected from those materials known for manufacturing electrical switching apparatus.

The polymer component and nanofiber component are combined to form the electrically resistive, heat sink composition for making electrically resistive, thermally conductive electrical switching apparatus, such as circuit breakers and enclosures, in accordance with the disclosed concept. The nanofiber component can be prepared and then incorporated into the first polymer component. For example, the polymer component can be used to form a molded object, e.g., the electrical switching apparatus or a portion thereof, utilizing a conventional injection molding technique. In general, injection molding involves selecting a cavity or mold, at least partially filling, e.g., injecting) the cavity or mold with a material, e.g., the polymer component, allowing the filled cavity or mold to set or cure, and extracting the molded object therefrom. The molded object can be formed at ambient temperature and pressure conditions.

In certain embodiments, the nanofiber component is incorporated into the polymer component by at least partially embedding nanofibers in or depositing nanofibers on an outer surface of the molded object. As previously described, the nanofiber component is prepared using a conventional technique known in the art. For example, electrospinnning or ForceSpinning can be employed to form and deposit nanofibers on a substrate or collector. In alternate embodiments, a layer of nanofibers can be at least partially formed on a collector, e.g., a carrier film, and then the collector having the layer of nanofibers can be applied to a substrate, or a layer of nanofibers can be formed directly on the substrate, e.g., directly on an inner surface of a mold, in the absence of a carrier film. In the embodiments wherein the nanofibers are formed on a carrier film, the carrier film is applied, e.g., connected or attached, to an inner surface of a cavity or mold such that upon filling of the cavity or mold, the polymer component comes into contact with the nanofibers on the film and upon extracting the molded polymer component from the mold, the nanofibers are at least partially transferred from the surface of the film to an outer surface of the molded polymer component, such that the nanofibers are at least partially embedded in (e.g., infused) or deposited on (e.g., coated on or layered on or laminated on) the outer surface to form a molded part or component including each of the polymer and nanofiber components. The carrier film is not transferred and remains at least partially in the mold or on the inner surface of the mold.

Alternatively, in the embodiments, wherein the nanofibers are formed directly on at least a portion of the inner surface of the mold, upon filling of the cavity or mold, the polymer component comes into contact with the nanofibers on the inner surface of the mold and upon extracting the molded polymer component from the mold, the nanofibers are at least partially transferred from the inner surface of the mold to an outer surface of the molded polymer component, such that the nanofibers are at least partially embedded in (e.g., infused) or deposited on (e.g., coated on or layered on or laminated on) the outer surface to form a molded composition including each of the polymer and nanofiber components.

The nanofiber component can be in the form of a web or mat, e.g., non-woven. The web or mat can be highly porous. In certain embodiments wherein the polymer component is optically transparent, deposition of the nanofiber component on the surface of the molded polymer component does not significantly decrease the optical transparency of the resulting molded composition.

The diameter of the nanofibers can vary and in certain embodiments, can be from about 10 nanometers to about 10 microns. Without intending to be bound by any particular theory, it is believed that the use of fibers which are of a nanoscale size results in improved interaction and bonding between the nanofiber component and the polymer component.

In certain embodiments, the surface conductivity of the molded composition including the polymer component and the nanofiber component is from about 10 ohms to about 100 mega-ohms. The surface conductivity of the molded composition can be controlled and tailored by the particular filler selected and the specific amount of filler.

Figure 3A:
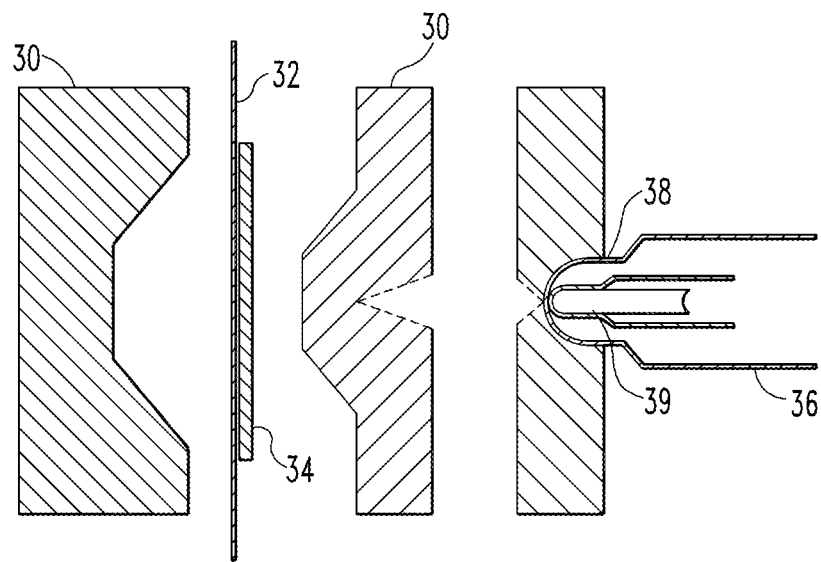
FIGS. 3A, B and C are schematics of a process for depositing nanofibers into a mold and subsequently onto a molded part, in accordance with certain embodiments of the disclosed concept.
Figure 3B:
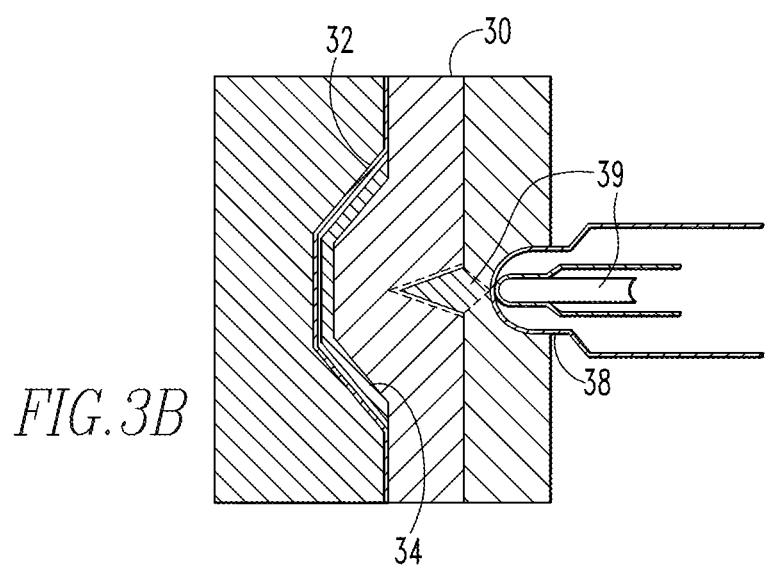
Figure 3C:
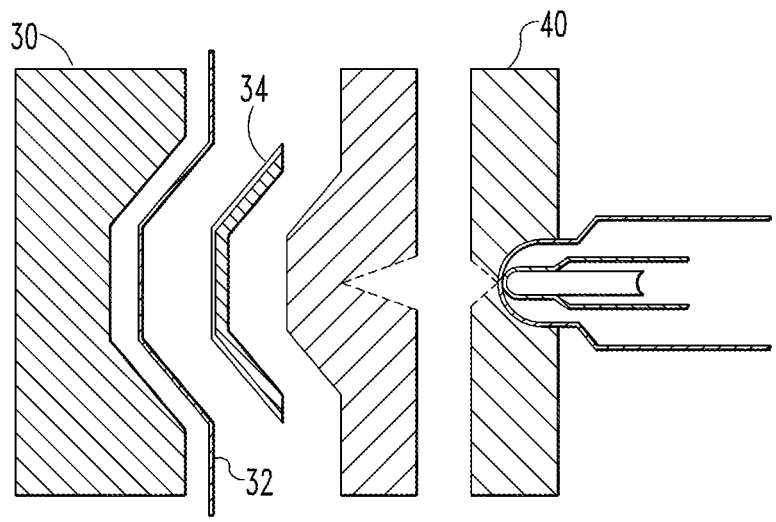

FIG. 3 illustrates an apparatus and process for depositing a coating of nanofibers on at least a portion of a surface of a molded part, in accordance with certain embodiments of the disclosed concept. As shown in FIG. 3A, a foil positioning step is employed to initiate the process. The apparatus for this step includes a die 30, a carrier film 32 and conducting nanofibers 34. The conducting nanofibers 34 are deposited onto the carrier film 32 and form a layer thereon. A nozzle 36 having a nozzle head 38 is used to inject material 39 into the die 30. Thus, the nozzle 36 includes the nozzle head 38 and the material 39 contained therein. The material 39 can include polymer or polymer-containing material, such as resin. FIG. 3B further shows an injection molding step which includes the carrier film 32 containing the conducting nanofibers 34 in contact with, e.g., attached or applied to, an interior surface of the die 30. The nozzle head 38 injects the material 39 into the die 30. FIG. 3C shows an extraction step wherein a molded part 40 is produced and an outer surface of the molded part 40 has deposited therein or thereon the conducting nanofibers 34 which are at least partially transferred from the carrier film 32 which is remaining on the interior surface of the die 30. The presence of the conducting nanofibers 34 on or in the surface of the molded part 40 allows the surface conductivity of the molded part 40 to be controlled or specified.

Each of the polymer and nanofiber components of the disclosed concept can include additional additives and adjuvants which are known in the art for use in preparing polymer-containing compositions and molded objects.

In certain embodiments, at least a portion of an electrically resistive, thermally conductive electrical switching apparatus is formed from the composition of the disclosed concept by combining the polymer and nanofiber components, and any additional additives to form a mixture. The mixture is then poured or injected into a cavity or mold and allowed to set or cure for an appropriate period of time to form a single molded piece, e.g., electrical switching apparatus, including the polymer component and the nanofiber component incorporated therein.

The composition of the disclosed concept may serve as a heat sink in an electrically resistive electrical switching apparatus, such as but not limited to a circuit breaker, an enclosure and a load center.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of preparing a thermally conductive and electrically non-conductive electrical switching apparatus, comprising:
   obtaining a polymer component;
   obtaining a plurality of nanofibers, consisting of:
      a polymer; and
      a filler,
   wherein thermal conductivity of the filler is higher than thermal conductivity of the polymer component;
      combining the polymer component and the plurality of nanofibers in an injection molding process to form a thermally conductive and electrically non-conductive molded component; and
      manufacturing an electrical switching apparatus comprising the molded component,
      wherein the electrical switching apparatus comprising the molded component effectively improves heat dissipation as compared to an electrical switching apparatus comprising the polymer component in absence of the plurality of nanofibers.

2. The method of claim 1, wherein the plurality of nanofibers is in a form of a layer that is at least partially deposited on a carrier substrate.

3. The method of claim 1, wherein the combining of the polymer component and the plurality of nanofibers, comprises:
   at least partially depositing the plurality of nanofibers on an inner surface of the mold, introducing the first polymer component into the mold, allowing the polymer component to set, transferring at least partially the plurality of nanofibers from the inner surface of the mold to an outer surface of the molded component and extracting the molded component from the mold.

4. The method of claim 3, wherein the plurality of nanofibers is deposited on a carrier film.

5. The method of claim 3, wherein the plurality of nanofibers is deposited directly on the inner surface of the mold in the absence of a carrier film.

6. The method of claim 1, wherein the electrical switching apparatus is selected from the group consisting of a circuit breaker, circuit breaker enclosure, load center, and load center enclosure.

* * * * *